United States Patent
Zonis et al.

[15] 3,634,944
[45] Jan. 18, 1972

[54] DRYING OF STICKY THERMOSENSITIVE HYDROUS GELS

[72] Inventors: Meyer Louis Zonis, Livingston; Girish Chandulal Shah, Wayne, both of N.J.; Kenneth Worden Saunders, Darien; Michael Niall Desmond O'Connor, Norwalk, both of Conn.

[73] Assignee: American Cyanamid Company, Stamford, Conn.

[22] Filed: June 1, 1970

[21] Appl. No.: 41,807

[52] U.S. Cl. .................................................. 34/12, 34/18
[51] Int. Cl. ............................................................ F26b 7/00
[58] Field of Search ............................................. 34/9, 12, 18

[56] References Cited

UNITED STATES PATENTS

| | | | |
|---|---|---|---|
| 2,045,328 | 6/1936 | Levey | 34/18 X |
| 2,379,824 | 7/1945 | Mummery | 34/23 X |
| 2,443,462 | 6/1948 | Kimberlin, Jr. et al. | 34/9 |

Primary Examiner—John J. Camby
Attorney—Evans Kahn

[57] ABSTRACT

A sticky water-soluble high-viscosity polyacrylamide hydrous gel is dried without significant decrease to its water-solubility by extruding the gel as paralleled cords upon a fast-travelling belt having a nonadherent surface and heating the cords with high-temperature gas until the surface of the cords is nontacky, and then discharging the cords upon a slowly travelling belt and completing the drying with low-temperature gas.

12 Claims, 4 Drawing Figures

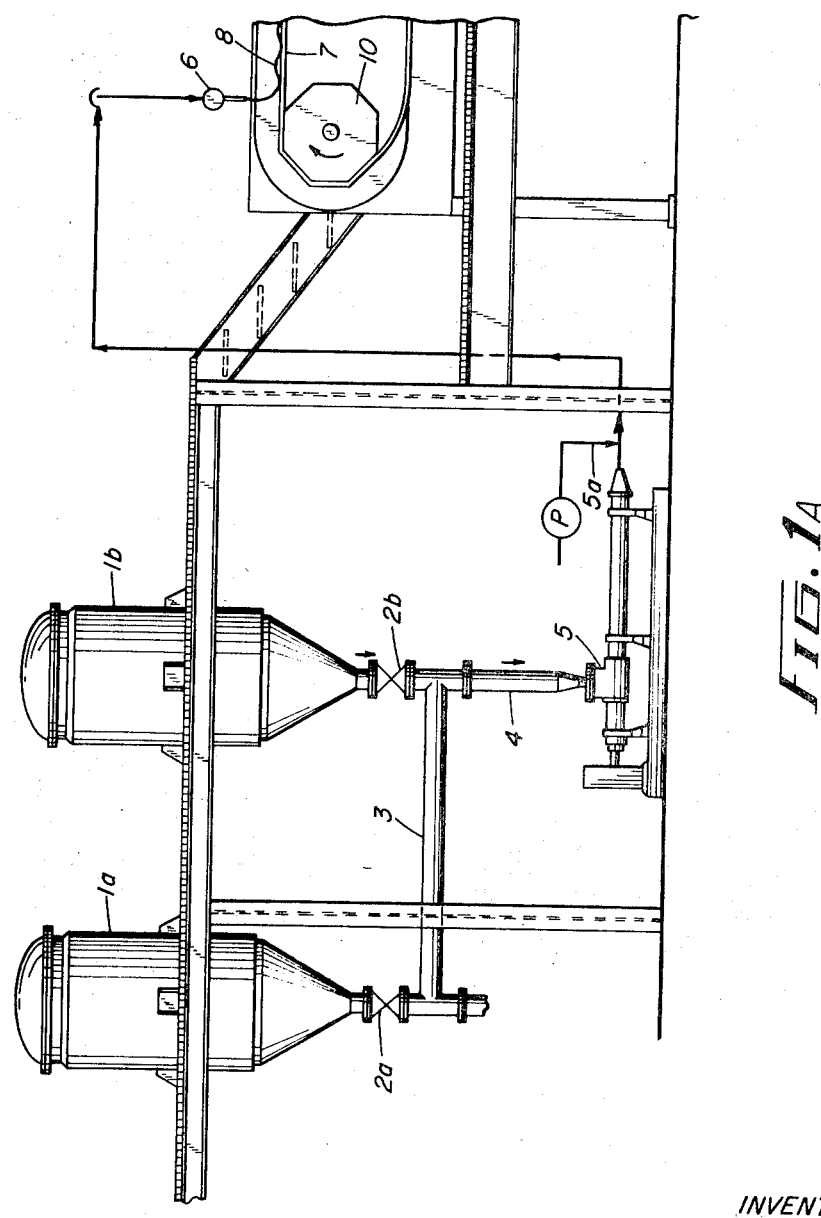

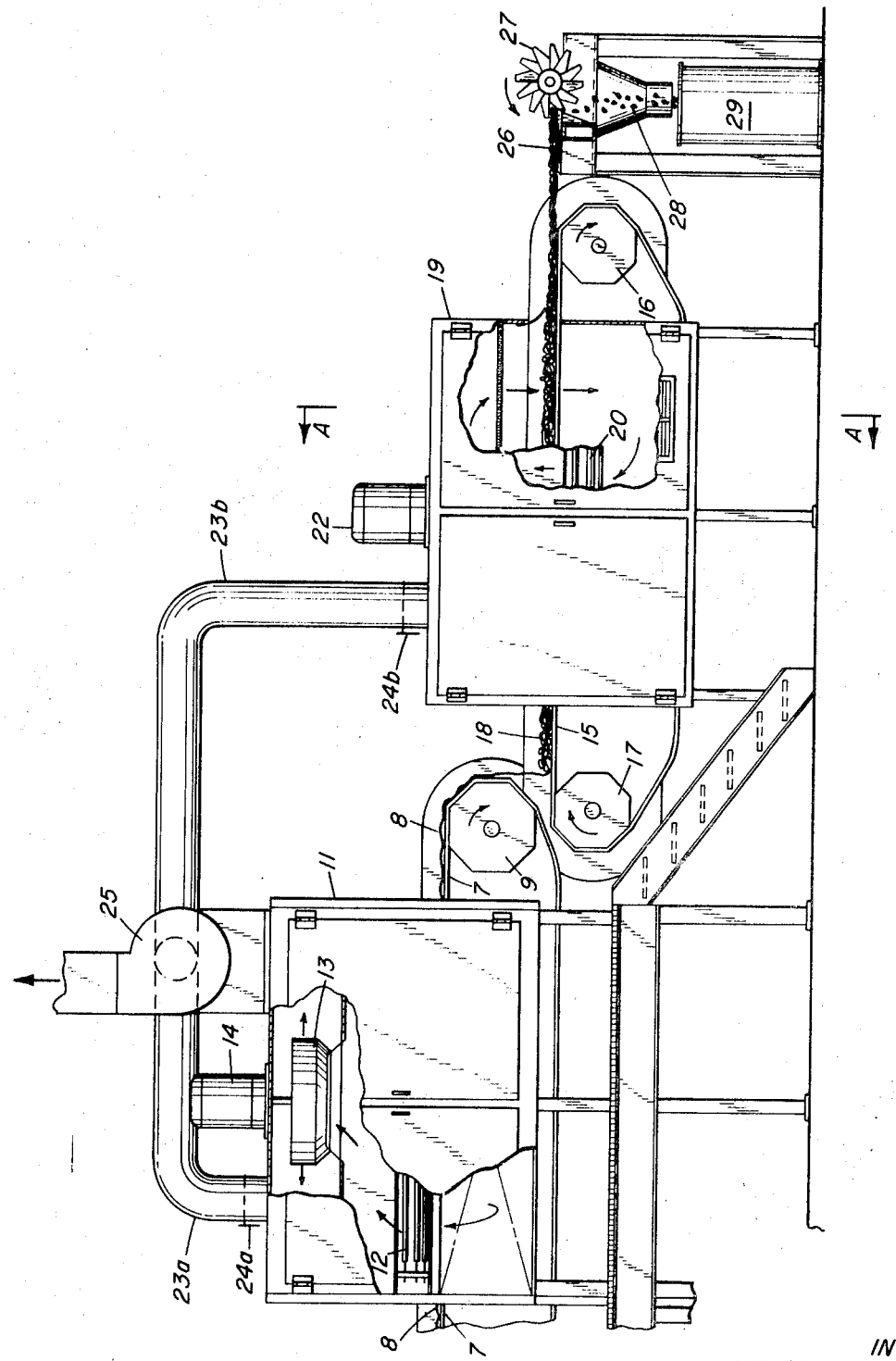

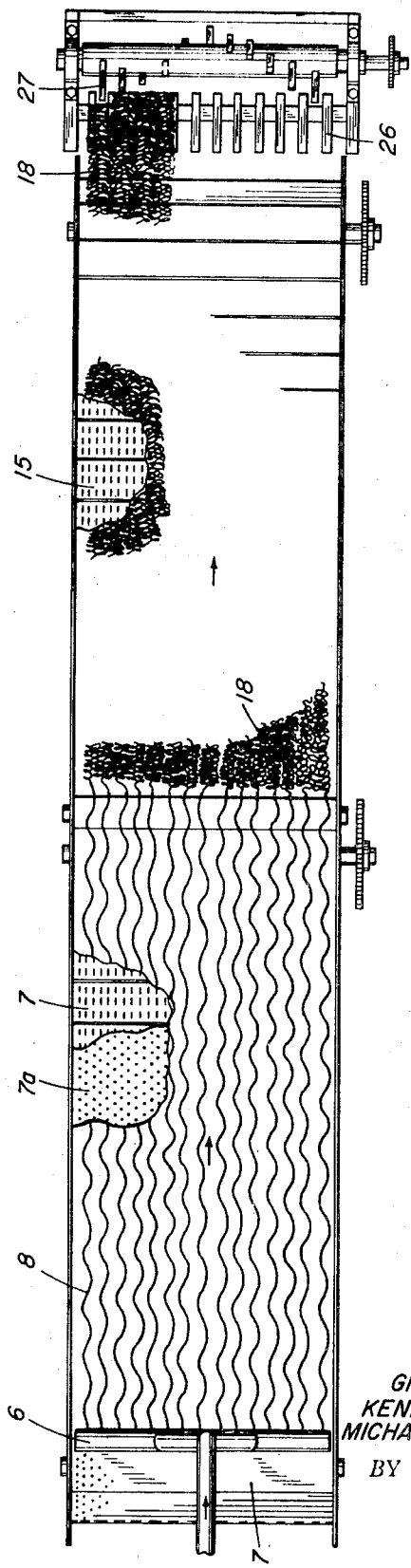

DRYING OF STICKY THERMOSENSITIVE HYDROUS GELS

The present invention relates to the continuous drying of sticky hydrous water-soluble substantially self-supporting acrylamide polymer gels to apparently dry nonadhesive and grindable state without rendering them water-insoluble, and to the grinding of said polymer to particulate free-flowing state likewise without rendering the polymer water-insoluble.

Water-soluble acrylamide polymers (vinyl polymers which contain at least 50 mol percent of acrylamide linkages) are currently produced on a major industrial scale and find use as wet and dry strengthening agents for paper and as flocculants in the purification of water. The polymers (hereinafter termed "polyacrylamides") are generally produced by polymerization in aqueous medium of acrylamide alone or in admixture with a molecularly minor amount of one or more water-soluble vinyl monomers copolymerizable therewith. The polymers are soluble in the aqueous medium. The polymers may be nonionic or they may be anionic or cationic (when they respectively contain anionic or cationic substituents). The immediate product of the polymerization is a clear hydrous gel so viscous as to be self-supporting i.e., so that a 1-inch cube thereof substantially maintains its shape when allowed to stand). The gel is very elastic and moreover it is intensely adhesive (about as much so as the glue of "Scotch" brand pressure-sensitive tape), and because of these properties it is very difficult to package in form acceptable to most consumers. Moreover, the gel is difficulty soluble in water and typically takes many days to dissolve. Experience has shown that the consumer prefers the polymer in apparently dry, particulate free-flowing (ground) form, one reason being that the polymer in this form dissolves comparatively rapidly in water. The gels are referred to possess low vapor and thermal permeability, and are very difficult to dry. When the gel is dried in normal manner in bulk at high temperatures, cross-linkages form on the surfaces of the gel which have been most strongly heated, causing portions of the polymer to become insoluble. One mechanism by which this cross-linking takes place is through formation of imide linkages as illustrated by the theoretical equation:

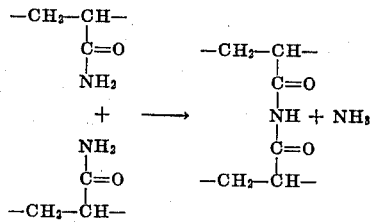

When the gel is dried at sufficiently low temperature to avoid formation of cross-linkages, an unduly long time and unduly large apparatus is required. Up to the present, for this reason, it has been considered impractical to dry the gel by the use of air (or other inert gas) alone.

The temperature at which the aforesaid cross-linkages start to form at a significant rate varies from instance to instance depending principally on the molecular weight of the polymer, the initial water content of the gel, the pH of the gel, the amount of monomer present, the molar proportion of the acrylamide units to any other units present in the polymer. The temperature at which these cross-linkages form in any instance to produce more than a negligible amount of water-insoluble matter (hereinafter termed "thermal degradation point") can be readily found by laboratory trial. For polyacrylamide itself the temperature is about 160° F. and for most acrylamide polymers the temperature is in the range of about 140°–195° F. From the point of view of efficient drying, these temperatures are low.

In the past, it has been proposed to comminute the gel and dry the gel to grindable state by the use of air of moderate temperature, (e.g., air having a temperature of 300° F.) in the hope that the water content of the gel would maintain the temperature of the gel sufficiently low to prevent formation of cross-linkages in insolubilizing proportions while providing an adequately fast rate of passage through the drier. It was found, however, that the temperature of the gel does. It was found, however, that the temperature of the gel does not remain uniform during such drying but that the outer surfaces and particularly the corners of the comminuted gel reach the thermal degradation point sufficiently in advance of the point at which the gel as a whole becomes dry so that these surfaces become thermally degraded and insoluble before the gel as a whole becomes sufficiently dry to be ground. The insoluble portions of the polymer appear as gelatinous particles which may be sufficiently large to be termed "fish eyes" (resembling tapioca particles) and usually must be removed by filtration before the polymer solution can be regarded as meeting commercial standards.

The discoveries have now been made that the aforementioned gels possess slight but significant adhesiveness to polytetrafluoroethylene ("Teflon"); that these gels, when extruded in the form of cords of more or less circular cross section of critical area and contacted briefly with an inert drying gas having a temperature substantially above the degradation point of the polymer in the gel, rapidly form a skin which is flexible, uniform, and nonadherent; that polyacrylamide gel carrying the aforementioned skin possesses substantially no adhesiveness for polytetrafluoroethylene and can be readily stripped therefrom; that the resulting cords (having nonadhesive surfaces) can be automatically formed into thick gas permeable mats which can be rapidly and safely dried by passage therethrough of an inert drying gas. By this means we have found that the sticky hydrous gels can be dried to hard grindable state in a compact drier at high throughput, that the resulting polymer is substantially completely (though slowly) water-soluble, and that this polymer becomes rapidly water-soluble when ground to powder form, as hereinafter more particularly described.

The nonadherent skin which is formed at the end of the first heating stage is temporary. The underlying body of the cords is highly hydrated, and when the cords are allowed to stand, water from the underlying body diffuses through the skin, rendering the surface substantially as tacky as it was before. In the process of the present invention, therefore, the second stage of drying is performed as a consecutive step, so that substantially no hydration of the skin occurs.

The present invention, therefore, is broadly a continuous process for the drying of a sticky, substantially self-supporting hydrous gel of a water-soluble thermosensitive polymer by extruding the gel as a plurality of parallel cords having a cross-sectional area between about 1 and 500 mm.² upon a travelling foraminous belt having a release surface for the polymer, passing a nonreactive drying gas having a temperature from 100° F. below to 300° F. above the degradation temperature of the polymer in the gel only until the surface of the cords has become nonsticky, discharging the nonsticky cords from the belt, and contacting the cords with a nonreactive drying gas having a temperature sufficiently low that the aforementioned cross-linkages do not form.

In the process, the cross section area of the cords is critical. If the area is much larger than 500 mm.², the second stage of the drying will take too long, the apparatus will not be compact, and the skin of the cords may become insoluble before the cords have been dried to grindable state. If the area is much less than 1 mm.², the power requirements of the apparatus increase sharply because it is difficult to extrude a tough rubbery gel in the form of small diameter threads, and since the volume/surface area ratio will be small, there is danger that during the drying, the temperature of the skin may be carried above the thermal degradation point. As the result of a large number of trials we have found it practical in the first stage to extrude the gel as cords having a cross section area in the range stated and to convert the surface of the cords into a nontacky skin by contact with a hot current of air, and then to form the cords into a thick mat and dry the mat with air having a temperature not substantially in excess of the thermal degradation point. Being nontacky and substantially self-supporting, the mat which is formed has an open structure permitting the passage of the drying air to every part.

The invention is described more in detail in the drawings, wherein

FIG. 1A is an elevation showing schematically the reactors in which acrylamide polymer gel is formed and the end of the first travelling belt on which the gel from the reactors is discharged;

FIG. 1B is an elevation partially broken away showing schematically the parts of the first and second belts on which the gel is dried, and the comminution of the dried polymer to coarse particulate state;

FIG. 2 is a plan view, partly in section, of the two belts and comminution section of the apparatus shown in FIGS. 1A and 1B.

In the figures the same reference numerals and letters designate the same components.

Figure 3:
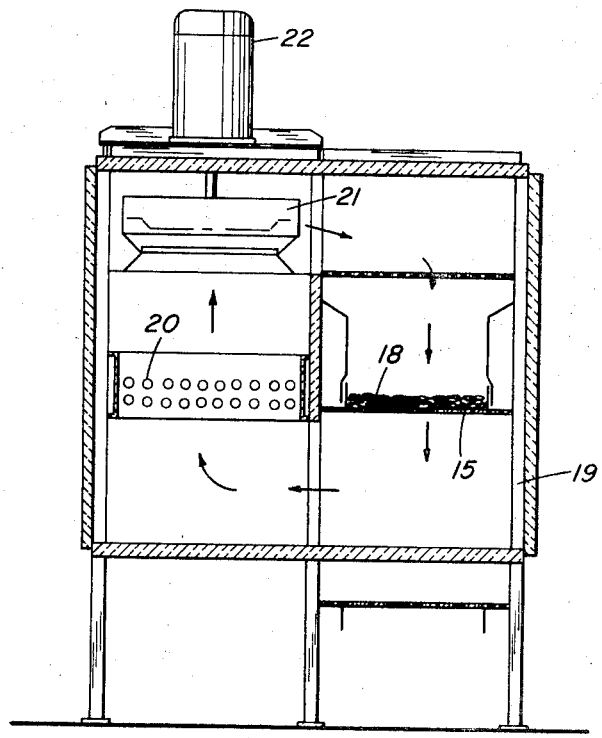
FIG. 3 shows partially in elevation and partially in section the apparatus for supply of hot inert gas to the second drying belt along line A—A' of FIGS. 1B and 2.

In FIG. 1A the acrylamide polymer hydrous gel is formed in polymerization chambers 1a and 1b working in parallel, and is supplied through valves 2a and 2b working alternately through pipes 3 and 4 to screw pump 5 provided with pipe 5a at its exit end for supply of special additives. The gel is supplied under pressure to header 6 extending across the width of travelling jointed steel belt 7 carrying release surface 7a where it is extruded in the form of cords 8 having a cross section area of 1 mm.$^2$ to 500 mm.$^2$ and preferably in the range of 25–50 mm.$^2$.

As is particularly shown in FIG. 1B, 2 and 3, belt 7 is carried forward by drive roll 9 and idler roll 10 and carries the cords into cabinet 11 where they are contacted with hot inert gas supplied by passage of the gas through conventional heating coils 12 and distributed by fan 13 driven by motor in housing 14. The gel cords now carrying a nontacky skin are discharged by gravity from nonadherent belt 7 and fall upon travelling belt 15 carried forward by drive roll 16 and supported by idler roll 17. The speed of belt 15 is one-tenth that of belt 7. As a result the cords form a mat 18 about 10 times the thickness of individual cords 8.

Belt 15 carries the mat into low-temperature drying cabinet 19 where the mat is dried by passage therethrough of inert drying gas heated by coils 20 and circulated by fan 21 driven by motor in housing 22 in the same manner as the gas in cabinet 11.

The humidity and solvent content of the gas is controlled by bleeding of gas through ducts 23a and 23b provided with dampers 24a and 24b leading into exhaust fan 25.

The mat of acrylamide polymer gel cords, now in hard, rigid fracturable state, is continuously discharged from belt 15 upon cutting table 26 where rotating chopper blades 27 fracture it into pieces 28 of grindable size, which are collected in bin 29.

The pieces are then ground to a particle size range (e.g., 90 percent through 40 mesh) which permits the polymer to dissolve rapidly when stirred with water. Any convenient grinder (for example, a hammer mill) may be used. In continuous operation the pieces entering the grinder are close to their thermal decomposition point, and the grinding operation further elevates the temperature of the polymer. The grinding temperature is, therefore, kept below the thermal decomposition point by the introduction of cold gas, and we have found it most convenient to supply such gas by spraying liquid nitrogen or carbon dioxide into the grinding chamber.

The numerical constants of the apparatus vary from instance to instance and do not conform to a simple rule. In each of the stages the principal variants are the speed of the belt; the diameter, water content and cross section configuration of the cords on entrance; the temperature, velocity and relative humidity of the air in the two chambers; and the supply (or nonsupply) of radiant (e.g., infrared) energy to the cords to provide a penetrating heat. The constants cannot be easily predetermined but can be determined by trial, employing the data of the examples as the start. However, we have found that in the second stage the temperature of the heating gas can be as much as 50° F. above the thermal degradation point without formation of an objectionably large proportion of insoluble matter in the polymer. In general, the larger the cross-sectional area of the polymer the lower should be the temperature of the second stage drying air. The maximum temperature can be used in the case of cords having cross-sectional areas in the bottom of the range (e.g., less than about 50 mm.$^2$). At the top of the range (e.g., in the range 100 mm.$^2$ to 500 mm.$^2$) the temperature of the drying gas should not be more than a few degrees above the thermal degradation point.

In the process, the dwell time of the polymer in the second drying stage need be no longer than is required to render the polymer conveniently grindable, i.e., with a water content of 5 to 15 percent. Insolubles tend to form in the polymer when the dwell time is extended, and there is no offsetting advantage.

The process of the present invention is usefully employed with gels of water-soluble acrylamide polymers which contain a material selected from the group consisting of cyanamide, guanidine, hydrazine, mercaptosuccinic acid, succinimide, thioglycollic acid, urea, and mixtures of these materials as agents which inhibit the formation of cross-linkages in the polymer. Without these materials, the dried acrylamide polymer product of the present invention generally contains a trace of water-insoluble material. With the above-mentioned materials present in effective amount (usually 0.02–2 percent on a dry basis), the polymer product is generally completely soluble in water. If desired, the materials may be introduced by uniformly mixing them in dry powdered state into the gel and allowing the gel to stand. The particles dissolve and become uniformly distributed through the gel. Alternatively, the materials may be incorporated into the gel by dispersing the material in solution state throughout the gel and allowing a few minutes for the liquid to diffuse through the gel. Alternatively still, the materials may be introduced into the solution of monomeric material from which the polymer is formed. Details are provided in copending application Ser. No. 878,883, filed on Nov. 21, 1967 by M.N.D. O'Connor. The presence of these compounds in the gel during the drying step confer the added benefit of converting any monomeric acrylamide present to other and nontoxic form, as is disclosed in said application. Monomeric acrylamide is toxic, and to this extent the materials recited above have the property of acting as detoxifying agents.

The grinding step is facilitated by the presence of a uniformly distributed amount of a water-soluble salt in the polymer. The salt increases the throughput of the grinder without increasing power requirements on the one hand, and permits the output of the grinder to be increased with less power than would be expected. Suitable salts for the purpose include sodium sulfate, potassium sulfate, sodium acetate, disodium phosphate, sodium nitrate, aluminum sulfate and magnesium sulfate.

The invention is further described by the examples which follow. These examples are preferred embodiments of the invention and are not to be construed in limitation thereof.

EXAMPLE 1

The following illustrates a typical embodiment of the present invention performed in apparatus similar to that described in the drawings.

An aqueous hydrous gel of polyacrylamide having a molecular weight of about 10 million, a water content of about 90 percent by weight, a thermal degradation temperature of about 160° F., is delivered under a pressure of about 100 lb./in.$^2$ by a screw pump to an extruder similar to that shown in FIG. 2. The extruder produces a parallel array, about 10 feet wide, of cords one-fourth inch in diameter and one-half inch apart. The extruded cords are about as sticky as surgical adhesive tape, they are very flexible, and resemble elastic band rubber. The cords fall without losing shape upon a horizontal stainless steel belt (10 feet wide and 2 inches below the extruder) carrying a polytetrafluoroethylene fabric surface and moving 10 feet per minute. This speed is slightly faster than the speed at which the cords leave the extruder. The cords adhere slightly to the polytetrafluoroethylene surface, so that the cords are slightly stretched and lie flat on the belt in parallel array. The cords are carried on the belt into a drying chamber 50 feet long where they are contacted with air at 330° F. flowing through the chamber at a speed of 300 feet per minute. On emerging from the chamber (dwell time 5.0 minutes) the cords have a water content of about 70 percent by weight. They carry a nonadhesive skin but are still flexible, elastic, clear and glossy, having soft and sticky centers.

The cords are then discharged upon a horizontal stainless steel belt moving 5.0 inches per minute and are carried in the form of a thick open-structured mat about 4 inches thick into a drier chamber 50 feet long where they are contacted with dry air at 160° F. On emerging from the chamber (residence time about 2 hours) the cords have a water content of 5–10 percent by weight and a diameter of about one-eighth inch. They are opaque, stiff, and uniformly hard and dry.

The mat is then passed under a rotary chopper where it is broken into pieces roughly one-half inch in largest dimension, which are fed into a hammer mill, the interior of which is maintained at 120° F. (well below the thermal degradation temperature of the polymer) by liquid nitrogen sprayed into the interior through pipes passing through the sides of the grinding chamber.

The product from the hammer mill has a particle size of 100 percent −18 mesh, 56 percent −30 mesh and 18 percent − 100 mesh. It dissolves completely in 30 minutes in water at one-half percent concentration at 70° F. No "fish eyes" are visible in the solution. Filtration of the solution shows that the product contains a trace (less than 0.5 percent) of insoluble matter.

EXAMPLE 2

The following illustrates the production of a similar dried polyacrylamide powder in more compact apparatus resulting from the use of a gas for the second drying step which has a temperature above the thermal degradation point of the polymer.

The procedure of example 1 is repeated using the same gel except that the length of the heated zone in the second drying oven is decreased to 35 feet, and the temperature of the second drying air is increased to 190° F. The product is substantially the same as the product of example 1. Evidently, in the second drying stage evaporation of water from the gel kept the temperature of the gel below the thermal degradation point of the polymer.

EXAMPLE 3

The following illustrates a method for the production of a dry acrylamide polymer which contains no detectable amount of insoluble polymer or other insoluble polymer.

The procedure of example 1 is repeated using the same gel except that the gel has a uniform dissolved content of 1 percent of urea based on the weight of polymer therein, as disclosed in said copending application.

The ground product dissolves completely in water at a concentration of one-half percent and a temperature of 70° F. and the solution contains no insoluble matter.

EXAMPLE 4

The following illustrates a process according to the present invention in which a polyacrylamide gel is dried and ground to a form in which it is rapidly and completely water-soluble and in which some of the amide substituents are converted to anionic (carboxylic) form.

The procedure of example 1 is repeated using the same gel except that 0.07 mol of sodium hydroxide (as a 15 percent by weight aqueous solution) per acrylamide linkage in the polymer is metered into the gel as it leaves the screw pump. About 7 percent of the amide substituents of the polyacrylamide hydrolyze during the subsequent mixing and drying steps, so that the product corresponds to a 93:7 molar ratio anionic acrylamide:acrylic acid copolymer. The product, after grinding, dissolves rapidly in water at one-half percent concentration and 70° F. to form a solution which contains less than 0.5 percent insoluble matter.

EXAMPLE 5

The following illustrates the process of the present invention on a gel wherein the polymer contains cationic substituents.

The procedure of example 1 is repeated except that the polymer in the gel which is dried is a 95:5 molar ratio acrylamide:2-(dimethylamino)ethyl methacrylate copolymer having a molecular weight of roughly 10,000,000. The product, after grinding, contains less than 0.5 percent insolubles.

EXAMPLE 6

The following illustrates the process of the present invention wherein the gel when dried contains a water-soluble salt as agent improving the grindability of the gel.

The procedure of example 1 is repeated except that sufficient of a 25 percent solution of sodium sulfate is metered into the gel as it leaves the screw pump to provide 15 percent of $Na_2SO_4$ based on the dry weight of the polymer. The dry polymer is substantially the same, but is more readily ground.

EXAMPLE 7

The following illustrates the process of the present invention applied to the drying of a preformed anionic acrylamide polymer gel with introduction of supplementary polymerization catalyst to detoxify any monomer present. The gel is similar to that of example 1, but the polymer is a 90:10 acrylamide:acrylic acid copolymer having a molecular weight of about 5,000,000.

The procedure of example 1 is repeated, except that into the gel transport line between the transfer pump and the extruder is pumped a solution of alkali metal persulfate ($K_2S_2O_8$) sufficient to supply 50–80 p.p.m. of the persulfate based on the dry weight of the polymer except that in the first stage of drying the cords are contacted with air at 265° F. for 9 minutes and in the second stage the cords (in matted state) are contacted with air at 180° F. for about 105 minutes. The dry polymer contains 0.01 percent by weight of water-insoluble matter.

EXAMPLE 8

The following illustrates the procedure of the present invention wherein drying and a large amount of hydrolysis occur during the drying.

The procedure of example 1 is repeated except that sufficient concentrated sodium carbonate solution is metered into the gel on exiting from the screw pump to provide 35 percent hydrolysis of the polyacrylamide, and in the first stage the gel is contacted with air at 265° F. for 21 minutes and in the second stage with air at 175° F. for 106 minutes. The product contains 9.8 percent water by weight, is readily grindable, and contains no detectable amount of insolubles.

We claim:
1. Continuous process for drying a sticky water-soluble, substantially self-supporting hydrous gel of a water-soluble acrylamide polymer without rendering said polymer water-insoluble, which comprises extruding said gel as a plurality of cords having a cross-sectional area between about 1 mm.² and 500 mm.² upon a travelling belt having a release surface for said polymer; contacting said cords on said belt with a non- reactive drying gas having a temperature from 100° F. below to 300° F. above the degradation point of the polymer in said gel only until a nonsticky skin has formed on said cords; discharging said cords from said belt; and contacting said discharge cords with a nonreactive drying gas having a temperature not more than 50° F. above the thermal degradation point of the polymer in said gel until said cords are sufficiently dry to be grindable.

2. A process according to claim 1 wherein the cross section area of the cords is in the range of 25 mm.² to 50 mm.².

3. A process according to claim 1 wherein the temperature of said first gas is 50°–100° F. above the degradation point of the polymer in said cords.

4. A process according to claim 1 wherein the polymer contains 0.02–2 percent by weight (dry basis) of a material selected from the group consisting of cyanamide, guanidine, hydrazine, mercaptosuccinic acid, succinimide, thioglycollic acid, urea, and mixtures thereof, as agent inhibiting formation of cross-linkages in said polymer.

5. A process according to claim 3 wherein the cords are discharged from said first belt upon a second belt having a speed about one-fifth to one one-hundredth that of the speed of said first belt.

6. A process according to claim 1 wherein the temperature of said second drying gas is at about the thermal degradation point of said polymer.

7. A continuous process for converting an aqueous, sticky, substantially self-supporting hydrous gel of a water-soluble acrylamide polymer to dry, particulate and readily water-soluble state, which comprises drying said gel to grindable state by the method of claim 1, and grinding said gel in an inert atmosphere having a temperature sufficiently low to maintain the temperature of said polymer during said grinding below its thermal degradation point.

8. A process according to claim 7 wherein the temperature of said atmosphere is maintained sufficiently low by evaporation of liquid nitrogen.

9. A process according to claim 1 wherein the gel contains a water-soluble alkaline material as hydrolyzing agent for amide substituents therein.

10. A process according to claim 9 wherein the alkaline material is sodium hydroxide.

11. A process according to claim 7 wherein the gel contains a water-soluble inorganic salt as agent improving the grindability of said gel.

12. A process according to claim 11 wherein the salt is sodium sulfate.

* * * * *